United States Patent
Ruutu et al.

(10) Patent No.: US 8,538,451 B2
(45) Date of Patent: Sep. 17, 2013

(54) LOCATION SERVICES

(75) Inventors: Ville Ruutu, Espoo (FI); Heikki Hemmi, Espoo (FI); Sebastian Kraufvelin, Tenhola (FI); Janne Muhonen, Helsinki (FI); Jarko Niemenmaa, Espoo (FI)

(73) Assignee: Nokia Corporation, Espoo (FI)

( * ) Notice: Subject to any disclaimer, the term of this patent is extended or adjusted under 35 U.S.C. 154(b) by 2036 days.

(21) Appl. No.: 11/260,228

(22) Filed: Oct. 28, 2005

(65) Prior Publication Data

US 2007/0015522 A1  Jan. 18, 2007

(30) Foreign Application Priority Data

Jul. 14, 2005 (GB) .................................. 0514495.1

(51) Int. Cl.
*H04W 24/00* (2009.01)

(52) U.S. Cl.
USPC .................. 455/456.1; 455/456.4; 455/456.3; 455/456.5; 455/456.6

(58) Field of Classification Search
USPC ................ 455/404.1, 404.2, 456.1–457, 433, 455/439, 560, 414.1, 414.2, 414.3, 422.1, 455/435.1, 436
See application file for complete search history.

(56) References Cited

U.S. PATENT DOCUMENTS

| | | | | |
|---|---|---|---|---|
| 6,463,289 | B1 * | 10/2002 | Havinis et al. | 455/456.4 |
| 6,580,914 | B1 * | 6/2003 | Smith | 455/456.6 |
| 7,801,533 | B2 * | 9/2010 | Maanoja et al. | 455/456.1 |
| 7,848,769 | B2 * | 12/2010 | Fulle et al. | 455/521 |
| 2003/0148774 | A1 * | 8/2003 | Naghian et al. | 455/456 |
| 2004/0185865 | A1 * | 9/2004 | Maanoja | 455/452.2 |
| 2005/0003797 | A1 * | 1/2005 | Baldwin | 455/404.1 |

FOREIGN PATENT DOCUMENTS

WO  WO 0235752 A2 *  5/2002

* cited by examiner

*Primary Examiner* — Olumide T Ajibade Akonai
(74) *Attorney, Agent, or Firm* — Squire Sanders (US) LLP (57) ABSTRACT

A wireless communications network for providing location services comprising: a network element comprising storage means for storing network information of mobile stations, said network information including location information relating to the location of a mobile station and a subscriber identity; a passive location data storage entity for storing passive location data and subscriber identities; and means for transferring the location information and subscriber identity from the network element to the passive location data storage entity whereby the location information constitutes said passive location data for providing location services to a location services client.

39 Claims, 11 Drawing Sheets

LOCATION SERVICES

This invention relates to location services in a wireless communications system.

Communication networks typically operate in accordance with a given standard or specification which sets out what the various elements of the network are permitted to do and how that should be achieved, i.e. the technology on which the communication is based. Mobile (wireless) communication systems provide mobility to the users of the communication system. An example of such a mobile communication system is the public land mobile network (PLMN), of which cellular radio communications networks are an example. Cellular radio networks allow the mobile stations (MS) to move from one location to another and are organised in cells which define how the locations are managed. Mobile stations can also roam from one network to another network that is compatible with the standard the mobile station is adapted to.

The cells of a cellular radio network provide access to the communications system. The cell can be defined as a certain geographical area given wireless coverage by at least one base transceiver station (BTS) serving user equipment (UE) via a wireless interface. The base transceiver station forms a part of a radio access network (RAN). Several cells may cover a larger service area than one cell. The radio access network is connected to a core network (CN), which provides call control and performs mobility and high-level security functions such as location updating and authentication.

In such systems, the mobile network apparatus and/or user equipment such as a mobile station can be employed for the provision of information regarding the geographical location of the user equipment and thus the user thereof. A communication system comprising the necessary network elements, entities, functionalities and interfaces required to provide location information is said to support location services (LCS).

The position of mobile user equipment, and the equipment's user, can be determined by various techniques. For example, known positioning methods include those based on radio cell coverage, global positioning system (GPS) satellite positioning, assisted GPS (A-GPS), time of arrival (TOA) algorithms, observed time difference of arrival (OTDOA) or enhanced observed time difference (E-OTD) algorithms, and cell global identity-timing advance (CGI-TA) methods.

Figure 1:
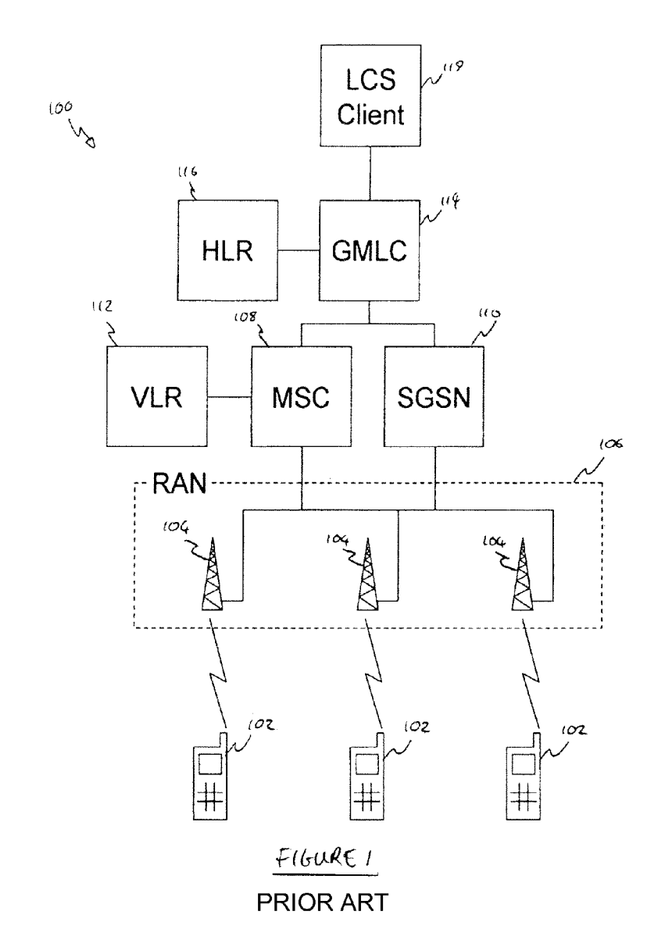
FIG. 1 shows a communications system for supporting location services in a single network.

A known system supporting location services is shown in FIG. 1. The example LCS system 100 shown in FIG. 1 corresponds to that used in the Global System for Mobile Communications (GSM) and Universal Mobile Telecommunication System (UMTS) network standards. Other network standards can also support location services.

FIG. 1 shows mobile stations 102 (often also referred to as a UE in UMTS, and the terms UE and MS are used interchangeably here), which communicate via a wireless interface to base transceiver stations 104 (often also referred to as a Node-B in UMTS). The base transceiver stations form the radio access network 106 shown dotted in FIG. 1. In the case of a UMTS network, the RAN would be a UMTS terrestrial radio access network (UTRAN). In the case of a GSM network, the RAN would be a GPRS EDGE radio access network (GERAN) (GPRS: general packet radio service; EDGE: enhanced data rates for GSM evolution).

The RAN 106 is connected to the core network. The RAN 106 connects to controllers such as a mobile switching centre (MSC) 108 and a serving GPRS support node (SGSN) 110. MSC and SGSN nodes are present in both GSM and UMTS networks. The MSC 108 handles circuit switched (CS) services and the SGSN 110 handles packet switched (PS) services. The MSC is connected to a visitor location register (VLR) 112. The VLR stores information on mobile stations that are visiting the network.

The MSC 108 and 110 nodes are connected to a gateway mobile location centre (GMLC) 114. The GMLC 114 contains functionality required to support LCS. The GMLC 114 is connected to a home location register (HLR) 116, which stores information regarding the mobile stations subscribing to the network. An LCS client 118 is connected to the GMLC. The LCS client may be external to the network. The LCS client 118 is the entity that requests information on the location of the MS 102, and the LCS client does this by first contacting a GMLC 114.

Figure 2:
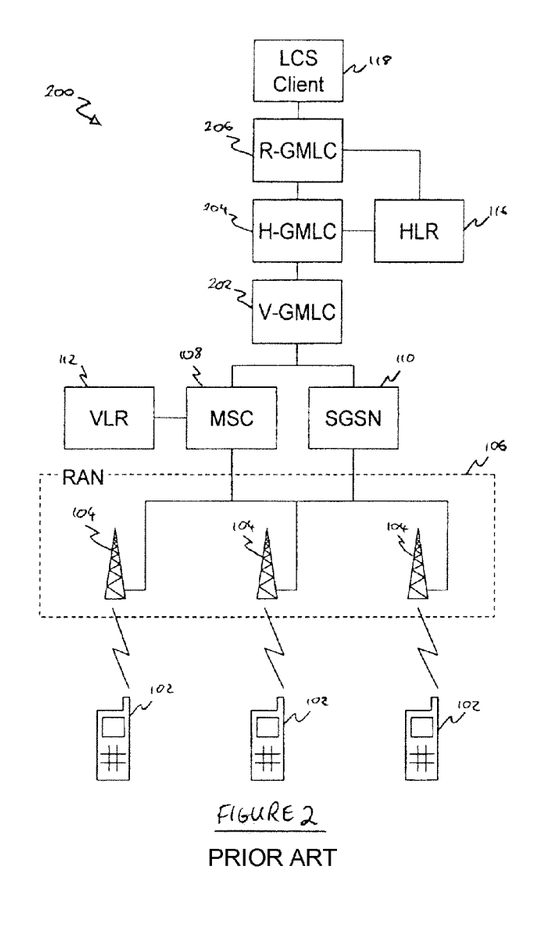
FIG. 2 shows a communications network for supporting location services over several networks.

A scenario that may be encountered occurs when the mobile station 102 is communicating with a network which is not its home network. Each network able to support LCS comprises a GMLC node, and these can communicate with each other to deliver the location services. This is illustrated in FIG. 2, which shows an LCS system 200 where three GMLC nodes are cooperating. The MS 102, BTS 104, RAN 106, MSC 108, SGSN 110 and VLR 112 are the same as illustrated in FIG. 1. The MS 102 are in a network that is not the home network of the MS. Therefore, the MS are registered in the VLR 112 of the visited network. The visited network contains a GMLC, denoted visited-GMLC (V-GMLC) 202. The home network of the MS 102 contains the home-GMLC (H-GMLC) 204, which is connected to the HLR 116 of the MS 102 which stores the MS subscription information. An LCS client 118 requests a location service from a third network which contains a third GMLC, denoted the requesting-GMLC (R-GMLC) 206. The R-GMLC is connected to the H-GMLC and the HLR. Although this example shows three different GMLC nodes, many other combinations are possible. For example, one GMLC node can act as both the V-GMLC and R-GMLC, or as the H-GMLC and R-GMLC. Furthermore, a single GMLC can act as the H-GMLC, V-GMLC and R-GMLC at the same time. The known manner in which the LCS system 200 operates in order to support LCS will be described presently.

The LCS system for UMTS and GSM is defined in 3GPP Technical Specification TS 23 271 V6.11.0 Release 6 "Functional Stage 2 Description of Location Services (LCS)". This defines two types of location request. The first type is an immediate location request, wherein a LCS client requests a location, and a response is sent immediately, containing the current location, if available. The second type is a deferred location request. With a deferred location request, a request is made for the location, and a response is sent once a specific event has occurred. The event may occur immediately, or at some point in the future.

The 3GPP standard further defines two types of event that are supported by the deferred location request. The first of these is a "UE available" event, which is any event in which the MSC 108 or SGSN 110 has made contact with a UE 102 after a period of the UE not being available. This event is triggered by the MSC 108 or SGSN 110. The second type of event is a "change of area" event, which is an event that occurs when a UE enters or leaves a pre-defined geographical area, or is within a pre-defined geographical area. This event is triggered by the UE 102. This is sometimes called geofencing.

The location requests can also be divided into mobile terminated location requests (MT-LR), network induced location requests (NI-LR), and mobile originated location requests (MO-LR). A MT-LR is a location request that originates outside of the UE at an external client. In other words, an external entity is requesting the UE location. A NI-LR is a location request that originates within the cellular network, but outside the UE. One example of a NI-LR is when the cellular network initiates location for emergency call location purposes. A MO-LR is a location request that originates from the UE itself, i.e. the UE requests its own location. Only mobile terminated location requests are considered here.

Figure 3:
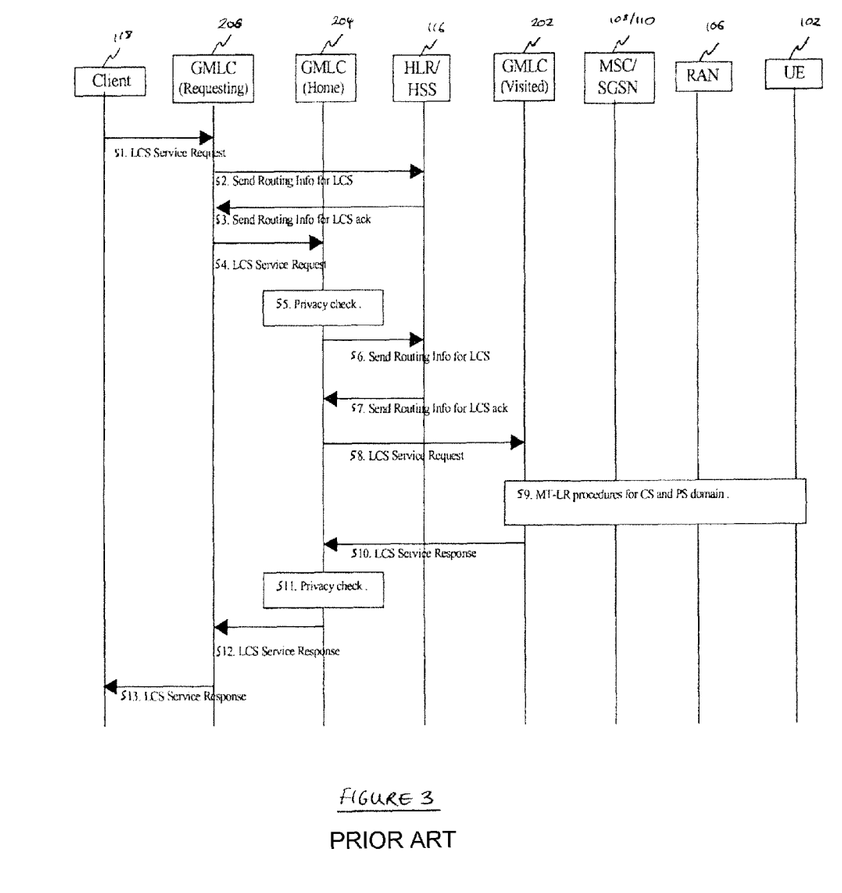
FIG. 3 shows signalling messages for an immediate mobile terminated location request.

The signalling messages exchanged during the operation of an immediate MT-LR in a known LCS system of the type shown in FIG. 2 can be seen with reference to FIG. 3. At step S1 an LCS client 118 requests the current location of a target UE from the R-GMLC 206. The R-GMLC verifies the identity of the LCS client and its subscription to the LCS service and derives the identity of the target UE. In step S2 the R-GMLC sends a SEND_ROUTING_INFO_FOR_LCS message to the HLR 116 of the target UE. The HLR 116 returns an acknowledgement in step S3. The acknowledgement can contain the network addresses of the current MSC 108 and/or SGSN 110 and the associated V-GMLC 202, if available, as well as the address of the H-GMLC 204.

In step S4, the R-GMLC 206 sends the location request to the H-GMLC 204. In step S5, the H-GMLC 204 performs a privacy check to determine whether the R-GMLC 206 is authorised to request location information on the target UE. Assuming the H-GMLC 204 determines that the location request is authorised to continue, at step S6, the H-GMLC 204 sends a SEND_ROUTING_INFO_FOR_LCS message to the HLR 116. This is responded to in step S7 with the network addresses of the current MSC 108 and/or SGSN 110 and the associated V-GMLC 202. The location request is then passed to the V-GMLC 202 in step S8.

In step S9, the procedures are then performed to determine the location of the target UE 102. The procedures differ depending on whether the request is a circuit switched MT-LR or packet switched MT-LR. These procedures are known in the art. In step S10, the response to the service request is passed from the V-GMLC 202 to the H-GMLC 204, and a further privacy check is performed by the H-GMLC 204 at step S11. Assuming the privacy check is passed, the response is passed to the R-GMLC 206 in step S12, and finally to the LCS client in step S13.

A problem with the operation described above with reference to FIG. 3 is that the R-GMLC 206 or H-GMLC 204 requests information from the HLR 116 regarding the serving SGSN/MSC of the target UE. With a high LCS usage, this can put a high load onto the HLR and also the associated signalling channels. A further problem can be seen with this operation for emergency call location processes in certain cases. For example, if the home PLMN of a roaming UE does not support LCS, or if the home PLMN does not allow inter-PLMN LCS procedures (i.e. it does not permit the information query for LCS at the HLR from other networks), and, in addition, if the emergency call centre operates in a "pull" mode, i.e. it sends a location request to a GMLC, then the operation shown in FIG. 3 is not supported. It can be seen that the operation described in FIG. 3 involves a significant amount of signalling and a large number of network elements, and consequently, with a high load of LCS traffic, the impact on the network is substantial. This has the further consequence that even if simple methods are used to determine the location of the UE 102, then the process may still take several seconds to provide the location to the LCS client 118.

Similar operations to the one shown in FIG. 3 are also known for deferred MT-LR, both for the "UE available" and "change of area" events. The detailed description of these operations can be seen in 3GPP Technical Specification TS 23 271 V6.11.0 Release 6 "Functional Stage 2 Description of Location Services (LCS)". The main difference for the deferred location requests over the one in FIG. 3 is that after the request is made, the location is not sent back to the LCS client immediately. Rather, the system waits until the particular event occurs, and then sends the location to the LCS client. As mentioned above, a distinction between the event types is that the "UE available" event is triggered by the MSC 108 or SGSN 110, whereas the "change of area" event is triggered by the UE 102.

The deferred MT-LR operations have the same problems as mentioned above for immediate MT-LR, in that a high load is placed on the HLR and the load on the network elements and signalling is substantial. Furthermore, the deferred MT-LR puts an extra loading on the SGSN/MSC or UE in order to detect the particular events. With a high load of location services, this can be significant.

The present invention seeks to provide a system and method for providing location services that reduces the load on the network resources.

According to one aspect of the present invention, there is provided a wireless communications network for providing location services comprising:

a network element comprising storage means for storing network information of mobile stations, said network information including location information relating to the location of a mobile station and a subscriber identity;

a passive location data storage entity for storing passive location data and subscriber identities; and means for transferring the location information and subscriber identity from the network element to the passive location data storage entity whereby the location information constitutes said passive location data for providing location services to a location services client.

In one embodiment the wireless communications network further comprises a location node, wherein said location node comprises the passive location data storage entity. In another embodiment the wireless communications network further comprises a location node, wherein the passive location data storage entity is connected to said location node.

In another embodiment the network element comprises a mobile switching centre and a visitor location register. In another embodiment the network element is a serving GPRS support node.

In another embodiment the location information is the identity of the mobile switching centre. In another embodiment the location information is the identity of the serving GPRS support node. In another embodiment the location information is a cell identity associated with the mobile station. In another embodiment the location information is a location area identity associated with the mobile station.

Preferably the network element comprises filter means for extracting the location information from the network information. In another embodiment the filter means is operable to extract the location information related to all subscribers from the network information. In another embodiment the filter means is operable to extract the location information related to particular subscribers from the network information. In another embodiment the filter means is operable to extract the location information related to a particular location from the network information.

According to another aspect of the present invention, there is provided a method of providing location services in a wireless communications network comprising the steps of:

storing at a network element network information of mobile stations, said network information including location information relating to the location of a mobile station and a subscriber identity; and transferring the location information and subscriber identity from the network element to a passive location data storage entity whereby the location information is held as passive location data for providing location services to a location services client.

In another embodiment the network element comprises a mobile switching centre and a visitor location register. In another embodiment the network element is a serving GPRS support node.

In another embodiment the location information is the identity of the mobile switching centre. In another embodiment the location information is the identity of the serving GPRS support node. In another embodiment the location information is a cell identity associated with the mobile station. In another embodiment the location information is a location area identity associated with the mobile station.

Preferably the method of providing location services further comprises the step of filtering the network information to extract the location information. In another embodiment the step of filtering comprises extracting the location information related to all subscribers from the network information. In another embodiment the step of filtering comprises extracting the location information related to particular subscribers from the network information. In another embodiment the step of filtering comprises extracting the location information related to a particular location from the network information.

In another embodiment the method of providing location services further comprises the steps of: receiving a location request from the location services client; determining the identity of the mobile switching centre and/or serving GPRS support node from the passive location data; requesting the location of the mobile station from the determined mobile switching centre and/or serving GPRS support node; and providing the location of the mobile station to the location services client.

In another embodiment the location services client is an emergency call centre, and the location request is an emergency call location request.

In another embodiment the method of providing location services further comprises the steps of: receiving a geographical location request from the location services client; determining whether the passive location data can satisfy the geographical location request; and, in the case that the passive location data can satisfy the request, translating the passive location data to the geographical location and sending the geographical location to the location services client.

In another embodiment the method of providing location services further comprises the steps of: receiving a request for geographical location when an event occurs from the location services client; monitoring the passive location data for the event; in the case that the event occurs, determining whether the passive location data can satisfy the geographical location request; and, in the case that the passive location data can satisfy the request, translating the passive location data to the geographical location and sending the geographical location to the location services client.

According to another aspect of the present invention, there is provided a wireless communications system for providing location services comprising:

a network element comprising storage means for storing network information of mobile stations, said network information including location information relating to the location of a mobile station and a subscriber identity;

a passive location data storage entity for storing passive location data and subscriber identities; and means for transferring the location information and subscriber identity from the network element to the passive location data storage entity whereby the location information constitutes said passive location data; and a location services client operable to request a location service, wherein the location service is delivered to the client based on the passive location data.

According to another aspect of the present invention, there is provided a network entity comprising:

means for receiving location information and a subscriber identity from an element in a network;

means for storing the location data and the subscriber identity, whereby the location information constitutes passive location data for providing location services to a location services client.

In another embodiment the network entity is a gateway mobile location centre.

Embodiments of the invention described in the following support emergency call locations, save HLR load and reduce response times.

For a better understanding of the present invention and to show how the same may be put into effect, reference will now be made, by way of example, to the following drawings in which.

Figure 4:
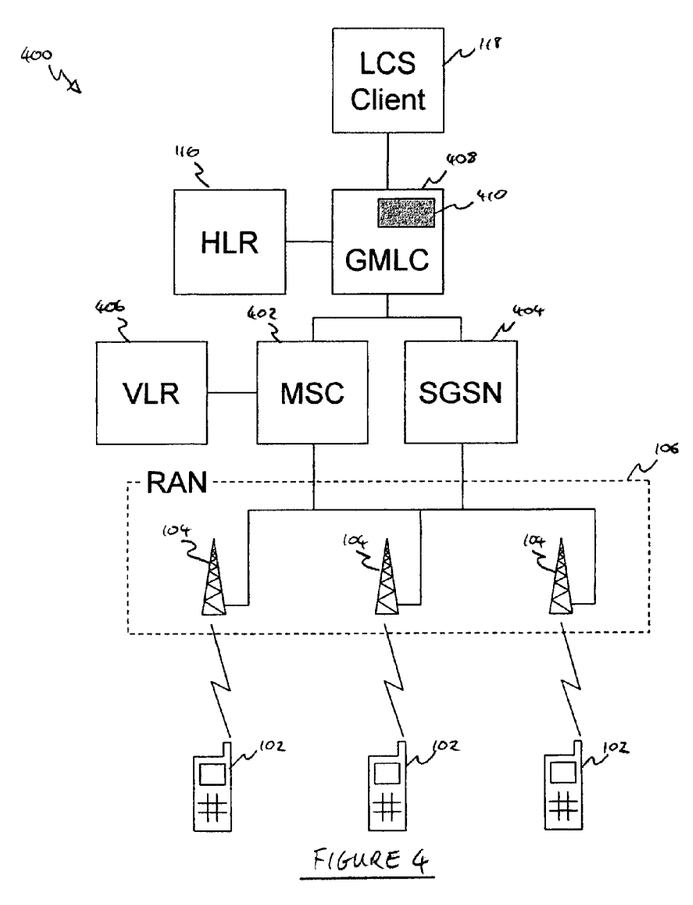
FIG. 4 shows a communications system according to a first embodiment of the invention.

Reference is first made to FIG. 4, which shows a communications system 400 for supporting LCS according to a first embodiment of the invention. The communications system 400 in FIG. 4 comprises MS 102, BTS 104, RAN 106, HLR 116 and LCS client 118 as described previously with reference to FIG. 1. The communications system 400 also comprises a MSC 402, SGSN 404, VLR 406 and GMLC 408 in common with FIG. 1, but these entities have new functionalities included in them, as will be described presently.

In particular, the GMLC node 408 has included within it a new functional element. This is a "passive location data" functionality 410. "Passive location data" is the term used herein to denote information which the inventors have appreciated is already available in the network, which could be useful for location purposes. Specifically, the inventors realised that such information is generated or produced for another reason (i.e. not for LCS), or is a by-product of other functionalities. Passive location data is not "location" information as such, because it has not been generated for that reason. Moreover, it may not be precise "location" data but is nevertheless useful for LCS. In many cases the passive location data is actually network topology information (for example the UE is under certain MSC, within a certain location area, or in a particular cell). With suitable information this information can be converted to actual geographical coordinates. This can be distinguished from the various methods for generating a UE location discussed previously, which are all "active location data", as the data is specifically generated for the purposes of LCS, and responsive to a LCS request.

Some examples of passive location data include: location update information; routing area information (whilst in a GPRS standby state); serving cell information (when a MS is during a call or sending a short message (SMS) or during a handover); and network measurement report (NMR) information. Passive location data can provide information on the serving MSC/SGSN of a specified mobile station, or provide information on a mobile station's geographical location, for example the cell identity or the location area (where a location area is a particular group of cells). Even the MSC/SGSN address or network identity can provide some information on the geographical location of a UE. For example, the MSC might indicate the city or the county of the UE, and the network identity the country. This information might be useful for some purposes, for example to know a time zone.

Such passive location data is produced by a number of network elements present in a mobile communication system for a number of different reasons. For example, passive location information may be generated by charging system elements or network monitoring elements. This includes network elements such as the MSC 402, VLR 406 and SGSN node 404. These network elements include support for network monitoring, and they also generate information for billing purposes. Other specific network elements are also used for billing (e.g. the billing centre), and can provide passive location data. Network elements in the RAN such as the base station controller (BSC) and radio network controller (RNC) can also provide passive location data. The data that is useful as passive location data is generated for several different functions. For example, in the VLR 406 the location area identity (LAI) needs to be stored for paging purposes and the cell identity (CI) is needed for mobility management purposes. Billing information is obviously generated and stored so that the subscribers can be charged for the services that they use. Included with the passive location data is the identity of the subscribers to which the information relates, and these are identified by identities such as the mobile station integrated services digital network (MSISDN) number or the international mobile subscriber identity (IMSI).

Figure 5:
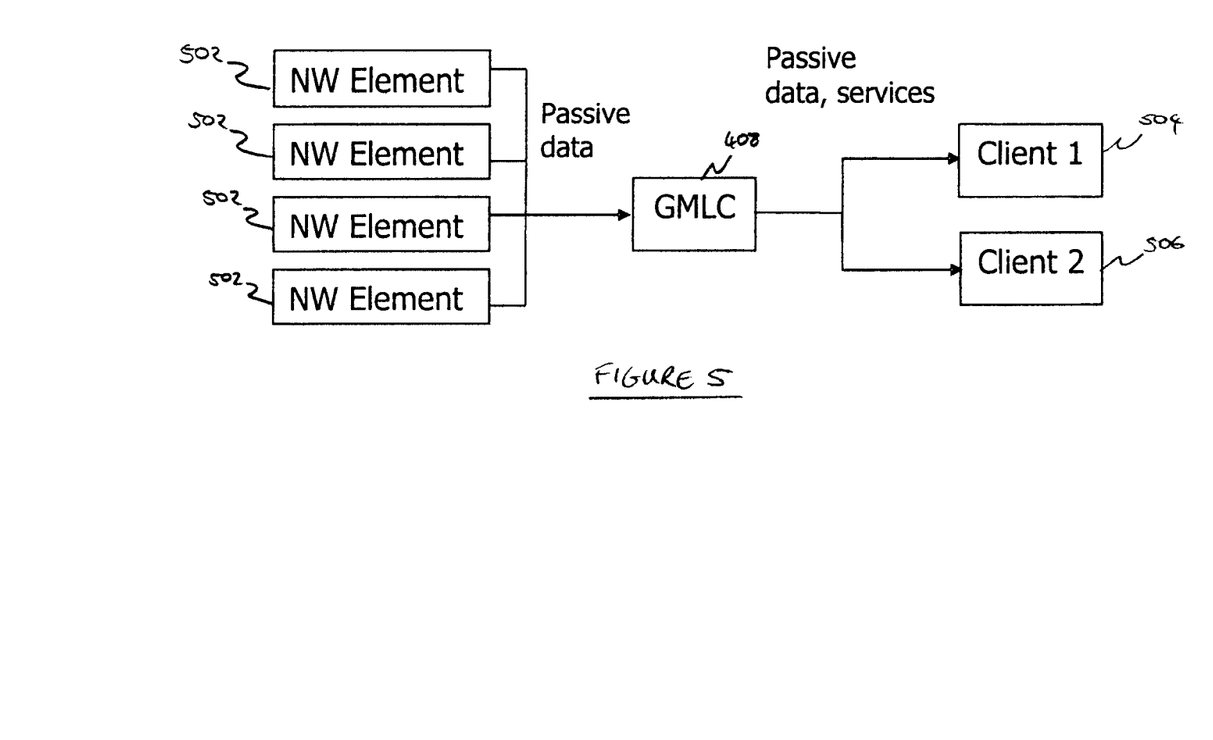
FIG. 5 shows a centralised passive location data architecture.

The passive location data functionality 410 located in the GMLC 408 is responsible for collecting and managing the passive location data and associated subscriber identities available in the network. The passive location data can then be used when providing location services. This is illustrated in FIG. 5, which shows the centralised passive location data architecture. FIG. 5 illustrates how various network elements 502, such as those mentioned above, provide the passive location data to the GMLC 408, which contains the passive location data functionality 410. The GMLC can then use the passive data or provide it to LCS clients 504, 506 as required.

Figure 6:
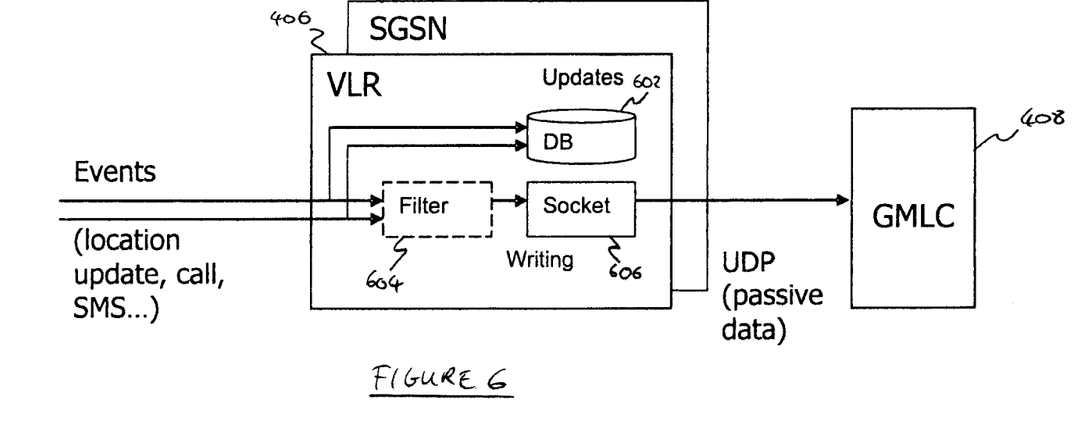
FIG. 6 shows a system for updating passive location data.

FIG. 6 shows how passive location data is collected by the GMLC 408. When a location update is performed (location updates can be performed periodically, or when a terminal moves to new location area), the VLR 406 is updated by the MSC 402 in a known manner. In addition, during a call or when an SMS is sent, the CI is updated in the VLR 406 in a known manner, as required for mobility management purposes. This data, with the identity of the associated subscriber, is useful as passive location data, and the VLR 406 has been modified in order to provide this data to the GMLC 408.

When events such as a location update, call, or SMS are reported to the VLR 406, the database 602 within the VLR is updated, as is known. In addition to this, the data is fed to a filter 604 which determines if the data is useful passive location data. The filter 604 in the VLR 406 may be configured to push all passive location data to GMLC (i.e. the filter passes all passive location data). Alternatively, the filter can perform filtering to select data that is of interest. For example, the GMLC or some application might be interested in certain subscribers (who have subscribed to certain location based services benefiting from passive location data). Then, the subscriber identity (e.g. the MSISDN or IMSI) is used to filter passive location data related to these subscribers. Another criteria on which to filter can be location area, cell identity, or MSC identity. This is applicable, for example, with location based advertising. In this case an application wants to know which subscribers are within a particular area, e.g. within a certain cell. An advertisement is sent to those that are in the area (assuming that subscribers have given their permission to such push advertising).

If the data is useful, it is passed to a network socket 606, which sends the passive location data and the associated subscriber identity over the network to the GMLC 408. The sending of the data may use the user datagram protocol (UDP), although other protocols may also be used. The UDP data may be given a lower priority than other data in the network, as it is not real-time information, to prevent the network becoming excessively congested due to passive location data updates. The GMLC 408 stores the passive location data and the identity of the subscriber at the passive location data functionality 410.

In order for the VLR 406 to continuously update the GMLC 408 in this manner, the VLR 406 needs to be modified to include the extra functionality. However, because the VLR 406 needs to write the information to its database 602 anyway, the extra overhead incurred by having to also write the UDP to a network socket is marginal.

The updating of passive location data in the manner described above corresponds to updates at the VLR 406 for circuit-switched services. However, a similar operation can also be performed for packet-switched services, for which the SGSN 404 is modified to include similar functionalities for providing passive location data to the GMLC 408 over UDP.

Therefore, using this system, the GMLC 408 is updated with passive location data which can be used in support of LCS services, in a manner that will be described hereinafter. The passive location data kept at the passive location data functionality 410 in the GMLC 408 needs to be timely information, in that it should not be too old (as the UE 102 may have moved) or it should not be undated. The passive location data therefore needs to be stored with a time stamp. This may be, for example, the reception time in the GMLC or VLR. The use of passive location data stored at the GMLC 408 allows most other aspects of the LCS system to remain unchanged, such as charging elements, client authentication and authorisation mechanisms, and security and encryption mechanisms.

Figure 7:
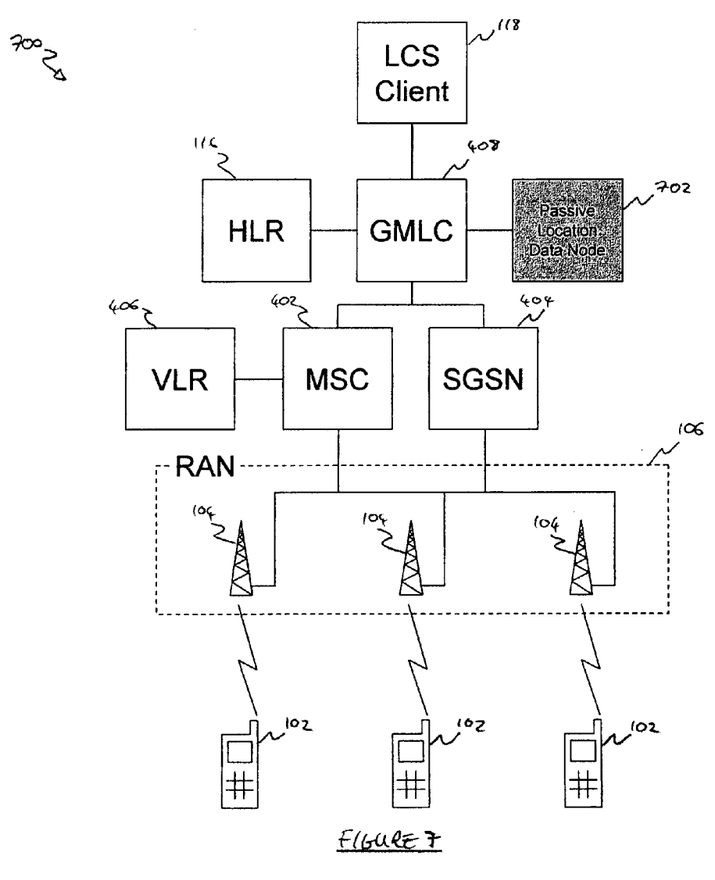
FIG. 7 shows a communications system according to a second embodiment of the invention.

A second embodiment of the present invention is shown in FIG. 7. In this second embodiment, the passive data location functionality (410 in FIG. 4) is not located in the GMLC 408, but is in a separate passive location data node 702 that is connected to the GMLC 408. The operation of the passive location data node 702 is identical to the passive location data functionality 410 in the GMLC 408 discussed previously. The passive location data node 702 is updated with passive location data in a manner identical to that shown in FIG. 6, except the UDP data is provided to the separate passive location data node 702, instead of to the GMLC 408. The UDP data is preferably provided directly to the separate passive location data node 702, although it can also be provided via the GMLC 408.

Figure 8:
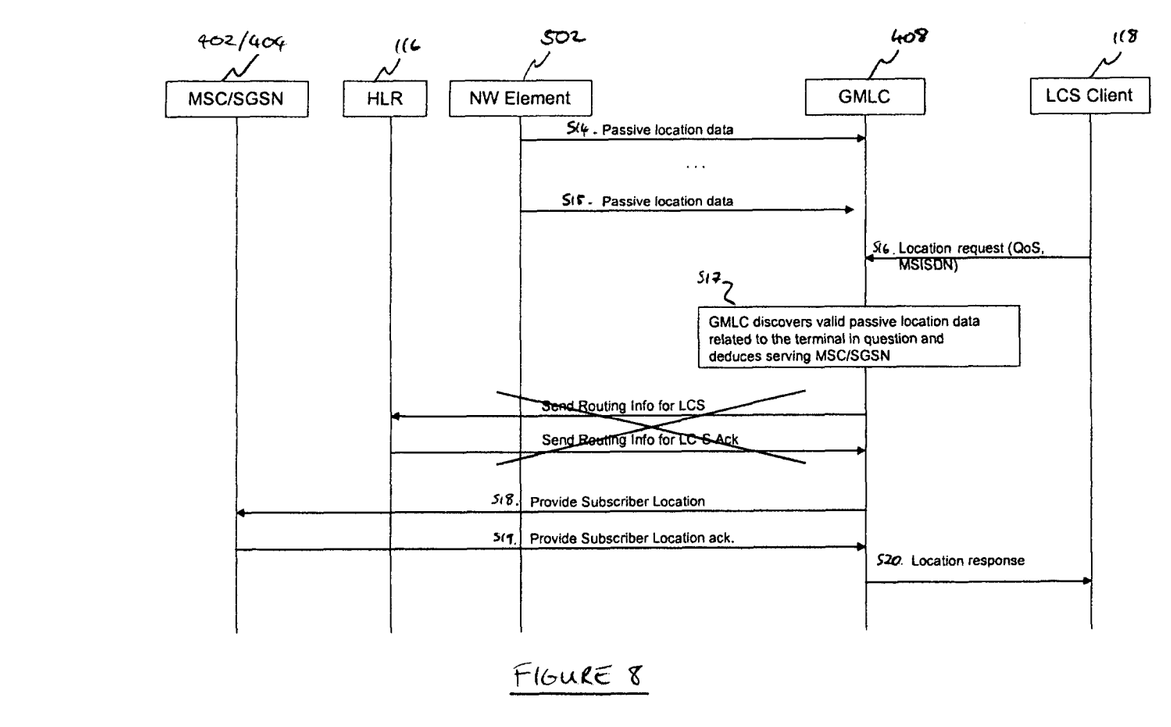
FIG. 8 shows signalling messages for a reduced HLR query rate using passive location data.

The use of passive location data can reduce the load that is present on the HLR and its associated signalling. This can be done as shown in FIG. 8 for the case of an immediate MT-LR. FIG. 8 shows a network element 502 providing the GMLC 408 with passive location data in steps S14 and S15, in a manner described previously with reference to FIG. 5 (such as the VLR providing passive location data to the GMLC 408 as shown in FIG. 6). At step S16, an LCS client 118 sends a location request to the GMLC 408. This is the same as the location request in S1 of FIG. 3.

In the known system in FIG. 3, the GMLC then sends a SEND_ROUTING_INFO_FOR_LCS message to the HLR 116 of the target UE, and receives an acknowledgment from the HLR 116. However, this step can be avoided using the operation in FIG. 8. The GMLC 408 checks at step S17 whether it has relevant passive location data available for the target UE, and if it does then it uses this to deduce the identity of the serving MSC or SGSN of the UE. The identity of the serving MSC or SGSN forms part of the passive location data. This information is obtained since the SGSN or MSC/VLR that sends the UDP data to the GMLC 408 can include its own identity in the information. In this way, the GMLC 408 does not need to send a SEND_ROUTING_INFO_FOR_LCS message to the HLR 116, and therefore saves both signalling and processing capacity of the HLR 116.

As a result of this, the GMLC 408 can contact the MSC 402 or SGSN 404 directly at step S18 to obtain the subscriber location, and get a response S19 that can be passed to the LCS client in step S20.

The use of passive location data at a GMLC can avoid the message sent to the HLR 116 from both the R-GMLC 206 and H-GMLC 204 shown in FIG. 3 at steps S2 and S6, respectively.

The operation described in FIG. 8 can apply both to the GMLC 408 with the integrated passive location data functionality 410 in FIG. 4 and also with the separate passive location data node 702 in FIG. 7. In the case of the separate passive location data node 702, the data is provided to the GMLC 408 via the connection between the GMLC 408 and the passive location data node 702. A similar operation to that shown in FIG. 8 can also be applied to deferred MT-LR to reduce load on the HLR 116.

Figure 9:
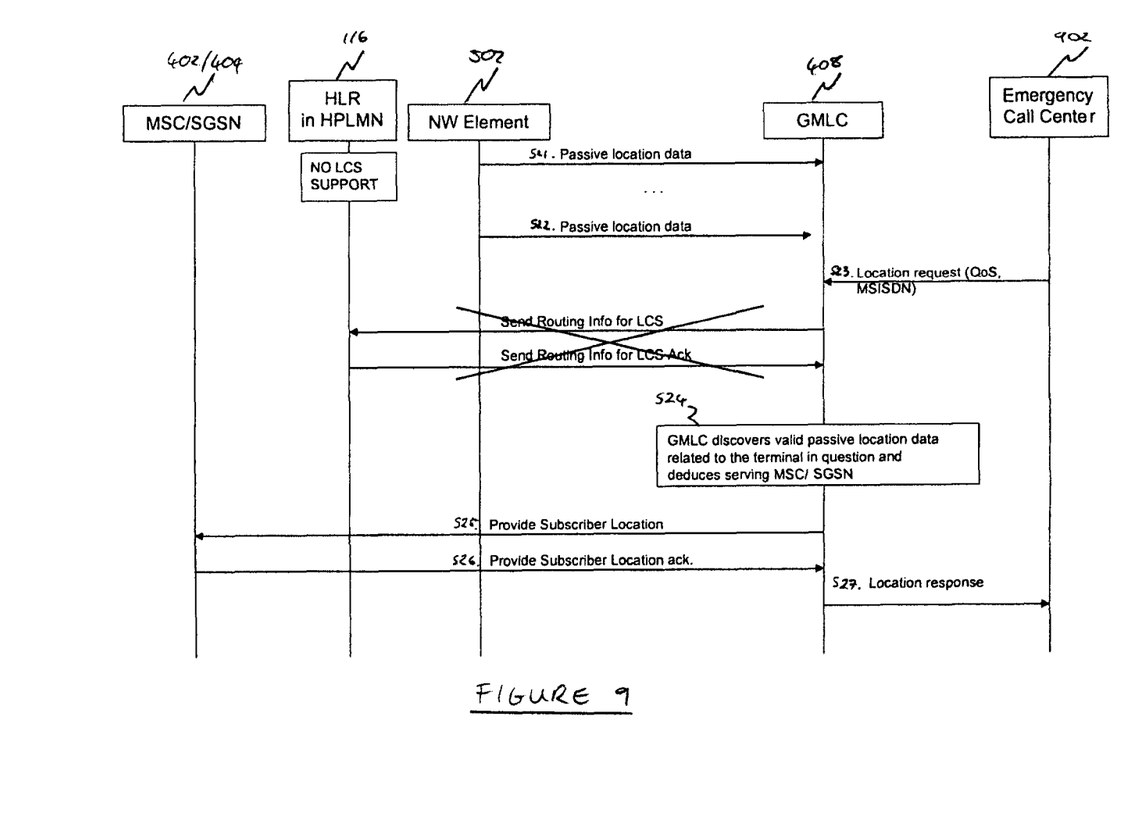
FIG. 9 shows signalling messages for emergency call location using passive location data.

The use of passive location data can also provide a solution to the problem of providing emergency call location. As was stated previously, if the home PLMN of a roaming UE does not support LCS, or if the home PLMN does not allow inter-PLMN LCS procedures, then "pull" emergency call location processes are not supported. FIG. 9 shows how this problem is avoided with passive location data. As with FIG. 8, a network element 502 provides the GMLC 408 with passive location data in steps S21 and S22. At step S23, an emergency call centre 902 requests the location of the UE. This is similar to the request from the LCS client in FIGS. 3 and 8.

As mentioned above, the GMLC 408 would usually have to contact the HLR 116 of the target UE with a SEND_ROUTING_INFO_FOR_LCS message. However, if the HLR does not support LCS, then the information on the serving MSC/SGSN cannot be obtained. To avoid this problem, the GMLC 408 at step S24 can check if it has passive location data for the UE, and if so deduce the serving MSC/SGSN from this information. Therefore, the HLR 116 that does not support LCS does not need to be contacted. The GMLC 408 can then contact the serving MSC 402/SGSN 404 at step S25, receive an acknowledgement at step S26 and send a response to the emergency call centre at step S27.

As was the case with FIG. 8, the operation described in FIG. 9 can apply both to the GMLC 408 with the integrated passive location data functionality 410 in FIG. 4 and also with the separate passive location data node 702 in FIG. 7.

The use of passive location data can be taken further, such that it is used not just to provide information on the serving MSC/SGSN, but gives an estimate of the actual geographical location of the UE. By doing this, the load on the network and the signalling can be substantially reduced. The degree to which passive location data can be used to estimate the actual geographical location depends on requested accuracy of location data. The cell identity can obviously be translated to a particular geographical area, although the passive location information is not limited to the use of CI. For example, location area ID may be useful for a local weather forecast service. For some applications that just want to know the local time zone, the MSC address or even network identity may be sufficient. Furthermore, if, for example, a BSC provides timing advance and received signal strength measurements as passive location data (which would only be available during an active connection such as a call) then better accuracy than the CI is obtainable.

Figure 10:
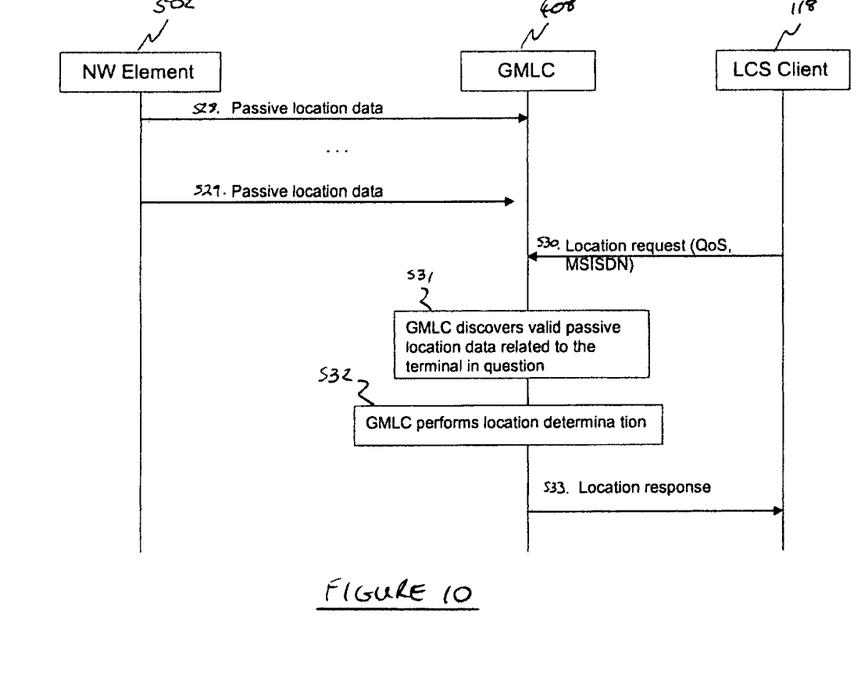
FIG. 10 shows signalling messages for an immediate mobile terminated location request using passive location data.

This is illustrated in FIG. 10 for the case of an immediate MT-LR. As was the case with FIG. 8, a network element 502 provides location information to the GMLC 408 at steps S28 and S29. A location request is sent from an LCS client 118 to the GMLC 408 at step S30. Firstly, the GMLC 408 checks if it has valid passive location data (i.e. data that is not too old) for the target UE, and if the requested geographical location accuracy can be met with the data at step S31. Passive location data may be available to satisfy this requirement if there has been, for example, a recent location area update, a recent call, or a recent SMS. If so, then the GMLC 408 performs the conversion of the passive location data to geographical information at step S32. This location estimate can then be provided directly to the LCS client 118 at step S33.

This saves resources in the network compared to the operation shown in FIG. 3, and also reduces the response time that the client experiences. This operation can also apply both to the GMLC 408 with the integrated passive location data functionality 410 in FIG. 4 and also with the separate passive location data node 702 in FIG. 7.

Figure 11:
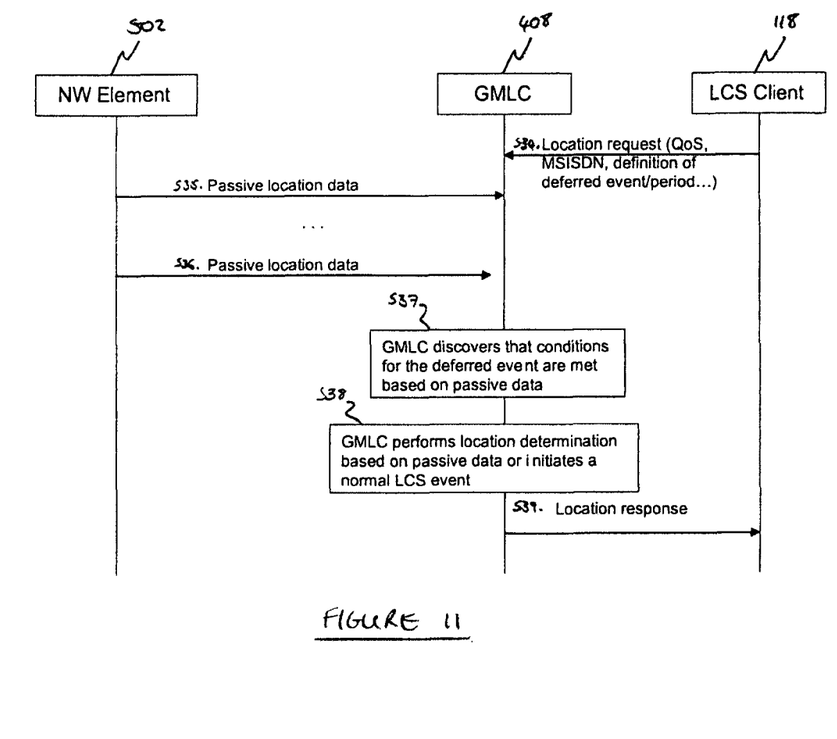
FIG. 11 shows signalling messages for a deferred mobile terminated location request using passive location data.

FIG. 11 shows how passive location data can be used to provide an estimate of geographical location in the case of a deferred MT-LR for the "change of area" event. FIG. 11 shows an LCS client 118 sending a deferred location request to the GMLC 408 at step S34. The GMLC 408 is provided with passive location data updates from a network element 502 at steps S35 and S36. The GMLC 408 monitors the information (such as cell identities or location area codes) until the particular criteria of the event is met. This is in contrast to the known operation, in which the UE must trigger the change of area event.

A similar process can also be performed in order to implement a deferred MT-LR for the "UE available" event. In a "normal" UE available MT-LR the MSC/SGSN monitors when the UE becomes available. When utilising passive location data, however, the GMLC 408 monitors when it receives recent passive location data related to a particular subscriber, and triggers the event.

At step S37, the GMLC 408 discovers that the conditions for the deferred location request have been met, based on the passive location data. The GMLC 408 at step S38 then uses the passive location data to determine the geographical location if it is able to with sufficient accuracy, or initiates a normal LCS procedure to determine the location. The location response is then sent to the LCS client 118 at step S39.

Using this operation, the heavy signalling load of deferred MT-LR is avoided, and the loading on the network elements is reduced. This type of operation does, however, have some higher requirements on the relevance of the passive location data sent to the GMLC 408, as it must be sufficiently reliable and relevant to trigger the event. This operation applies both to the GMLC 408 with the integrated passive location data functionality 410 in FIG. 4 and also with the separate passive location data node 702 in FIG. 7. Passive location data can also be used for other deferred MT-LR services that are not currently included in the 3GPP standards, such as a proximity alert service for when two or more mobile stations are near each other.

The invention claimed is:

1. An apparatus, comprising:
a storer to store network information of mobile stations, said network information including location information relating to a location of a mobile station and a subscriber identity,
wherein the apparatus is configured to push location information and subscriber identity from a visitor location register to a passive location data storage entity, and
wherein the location information comprises passive location data.

2. A network element comprising the apparatus of claim 1.

3. A system, comprising:
a network element according to claim 2; and
a passive location data storage entity for storing passive location data and subscriber identities;
wherein the network element is configured to transfer the location information and subscriber identity to the passive location data storage entity, wherein the location information comprises said passive location data regarding provision of location services to a location services client.

4. The system of claim 3, further comprising:
a location node, wherein said location node comprises the passive location data storage entity.

5. The system of claim 3, further comprising:
a location node, wherein the passive location data storage entity is connected to said location node.

6. The system of claim 3, wherein the network element comprises a mobile switching center and the visitor location register.

7. The system of claim 3, wherein the network element is a serving general packet radio service support node.

8. The system of claim 6, wherein the location information is an identity of the mobile switching center.

9. The system of claim 7, wherein the location information is an identity of the serving general packet radio service support node.

10. The system of claim 3, wherein the location information is a cell identity associated with the mobile station.

11. The system of claim 3, wherein the location information is a location area identity associated with the mobile station.

12. The system of claim 3, wherein the network element comprises a filter configured to extract the location information from the network information.

13. The system of claim 12, wherein the filter is configured to extract the location information related to all subscribers from the network information.

14. The system of claim 12, wherein the filter is configured to extract the location information related to particular subscribers from the network information.

15. The system of claim 12, wherein the filter is configured to extract the location information related to a particular location from the network information.

16. A method, comprising:
storing at a network element network information of mobile stations, said network information including location information relating to the location of a mobile station and a subscriber identity; and
pushing the location information and subscriber identity from the network element to a passive location data storage entity, wherein the pushing the location information comprises pushing the location information from a visitor location register.

17. A method as claimed in claim 16, further comprising:
receiving a geographical location request from the location services client;
determining whether the passive location data can satisfy the geographical location request; and,
when the passive location data can satisfy the request, translating the passive location data to the geographical location and sending the geographical location to the location services client.

18. A method as claimed in claim 16, further comprising:
receiving a request for geographical location when an event occurs from the location services client;
monitoring the passive location data for the event;
when the event occurs, determining whether the passive location data can satisfy the geographical location request; and,
when the passive location data can satisfy the request, translating the passive location data to the geographical location and sending the geographical location to the location services client.

19. The method of claim 16, wherein the location information is held as passive location data regarding provision of location services to a location services client.

20. A method as claimed in claim 19, wherein the network element comprises a mobile switching center and the visitor location register.

21. A method as claimed in claim 19, wherein the network element is a serving general packet radio service support node.

22. A method as claimed in claim 20, wherein the location information is an identity of the mobile switching center.

23. A method as claimed in claim 21, wherein the location information is an identity of the serving general packet radio service support node.

24. A method as claimed in claim 19, wherein the location information is a cell identity associated with the mobile station.

25. A method claimed in claim 19, wherein the location information is a location area identity associated with the mobile station.

26. A method as claimed in claim 19, further comprising:
filtering the network information to extract the location information.

27. A method as claimed in claim 26, wherein the filtering comprises extracting the location information related to all subscribers from the network information.

28. A method as claimed in claim 26, wherein the filtering comprises extracting the location information related to particular subscribers from the network information.

29. A method as claimed in claim 26, wherein the filtering comprises extracting the location information related to a particular location from the network information.

30. A method as claimed in claim 22, further comprising:
receiving a location request from the location services client;
determining the identity of the mobile switching center from the passive location data;
requesting the location of the mobile station from the determined mobile switching center; and
providing the location of the mobile station to the location services client.

31. A method as claimed in claim 30, wherein the location services client is an emergency call center, and the location request is an emergency call location request.

32. A method as claimed in claim 23, further comprising:
receiving a location request from the location services client;
determining the identity of the serving general packet radio service support node from the passive location data;
requesting the location of the mobile station from the serving general packet radio service support node; and
providing the location of the mobile station to the location services client.

33. An apparatus, comprising:
storer means for storing network information of mobile stations, said network information including location information relating to a location of a mobile station and a subscriber identity; and
pushing means for pushing location information and subscriber identity to a passive location data storage entity, wherein the location information comprises location data, wherein the pushing the location information comprises pushing the location information from a visitor location register.

34. An apparatus, comprising:
a receiver configured to receive location information and a subscriber identity pushed from an element in a network, wherein the element in the network comprises a visitor location register;
memory configured to store the location information and the subscriber identity, wherein the location information comprises passive location data regarding provision of location services to a location services client; and
a manager configured to manage said location information and said subscriber identity.

35. The apparatus of claim 34, wherein the apparatus is a gateway mobile location center.

36. A method, comprising:
receiving location information and a subscriber identity pushed from an element in a network, wherein the element in the network comprises a visitor location register;
storing the location information and the subscriber identity, wherein the location information comprises passive location data regarding provision of location services to a location services client; and
managing said location information and said subscriber identity.

37. An apparatus, comprising:
a receiver configured to receive location information and a subscriber identity pushed from an element in a network, wherein the element in the network comprises a visitor location register;
memory configured to store the location information and the subscriber identity, wherein the location information comprises passive location data regarding provision of location services to a location services client;
a further receiver configured to receive a request for location services for a location services client; and
a responder configured to respond to said request based on said stored location information.

38. A method, comprising:
receiving location information and a subscriber identity pushed from an element in a network, wherein the element in the network comprises a visitor location register;
storing the location information and the subscriber identity, wherein the location information comprises passive location data regarding provision of location services to a location services client;
thereafter receiving a request for location services for a location services client; and
responding to said request based on said stored location information.

39. A non-transitory computer-readable medium encoded with instructions that, when executed on a computer, perform a process, the process comprising: storing at a network element network information of mobile stations, said network information including location information relating to the location of a mobile station and a subscriber identity; and pushing the location information and subscriber identity from the network element to a passive location data storage entity, wherein the pushing the location information comprises pushing the location information from a visitor location register.

* * * * *